United States Patent [19]

Jackson

[11] 3,993,997
[45] Nov. 23, 1976

[54] COMMUNICATION SYSTEM AND METHOD
[75] Inventor: Homer E. Jackson, McLean, Va.
[73] Assignee: Navsat Corporation, Washington, D.C.
[22] Filed: Dec. 17, 1971
[21] Appl. No.: 209,322

Related U.S. Application Data
[63] Continuation-in-part of Ser. No. 811,287, March 28, 1969, Pat. No. 3,691,559.

[52] U.S. Cl. .......................... 343/112 CA; 325/58; 343/100 CS; 343/112 D; 343/112 TC
[51] Int. Cl.² ................... G08G 5/04; G01S 11/00; G08G 5/00
[58] Field of Search ............ 343/112 D, 6, 112 CA, 343/112 TC, 100 CS; 325/58

[56]  References Cited
UNITED STATES PATENTS
3,550,129  12/1970  Steele ......................... 343/112 CA Primary Examiner—Maynard R. Wilbur
Assistant Examiner—Richard E. Berger
Attorney, Agent, or Firm—Lowe, King, Price & Markva

[57]  ABSTRACT

An aircraft collision avoidance system and method involves transmitting a stable reference frequency from a synchronous satellite to aircraft in a region being monitored. Each aircraft in the region receives the reference frequency and transmits a carrier, modulated with the received reference frequency, to other aircraft in a collision avoidance zone. At the other aircraft, an indication of impending collision is provided by measuring the rate of change of the carrier Doppler frequency shift received thereby from the first named aircraft. Sync pulses periodically modulate the reference frequency transmitted from the satellite for aircraft ranging and data control purposes. To limit the collision warning zone relative to each aircraft, the receiver thereof is deactivated at a predetermined time after each sync pulse is received from the satellite.

37 Claims, 4 Drawing Figures

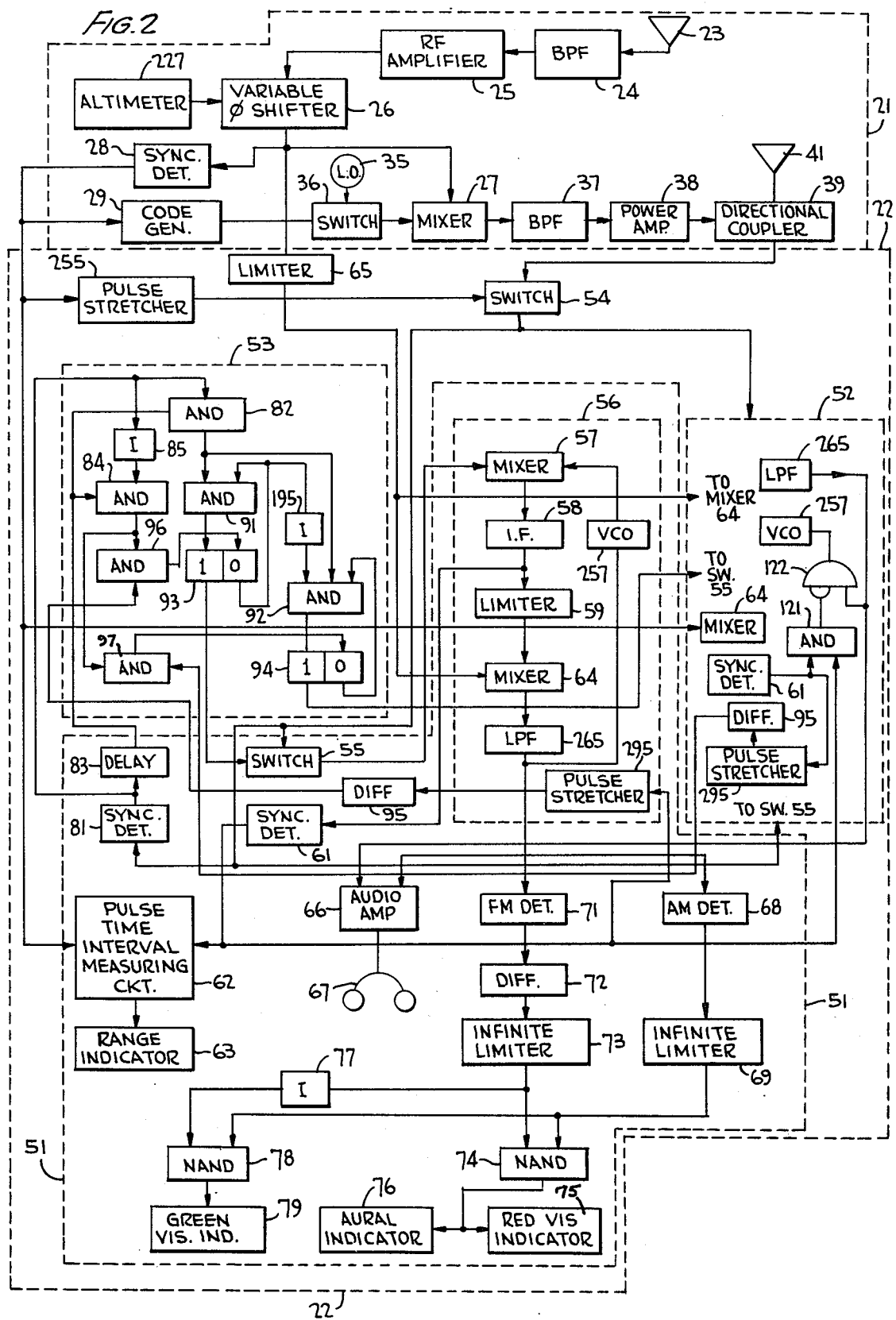

COMMUNICATION SYSTEM AND METHOD

This application is a continuation-in-part of my copending application entitled "Aircraft Collision Warning System," Ser. No. 811,287, now U.S. Pat. No. 3,691,559, filed Mar. 28, 1969.

The present invention relates generally to vehicle collison warning systems and methods and, more particularly, to a warning system and method wherein a stable reference frequency is transmitted from a synchronous satellite, received on the vehicles and relayed between the vehicles.

Because of the dire consequences resulting from mid-air aircraft collisions, the problem of vehicle collision avoidance has received considerably attention. Many systems and techniques for solving the problem of vehicle collision avoidance have been proposed, and at present, several of these systems and methods are being adapted on a limited basis. A characteristic of those systems and methods being adapted is the incompatability thereof with many general aviation aircraft, which are of relatively low cost and weight, and are therefore not susceptible to carrying a large amount of expensive, space-consuming and heavy electronic equipment. While such aircraft are incapable of carrying complex equipment for practical reasons, they nevertheless have been involved in numerous mid-air collisions, resulting in considerable loss of life and property.

It is, accordingly, an object of the present invention to provide a new and improved aircraft collison avoidance system and method particularly adapted for use in conjunction with relatively small and inexpensive aircraft, as well as large, expensive and complex aircraft.

In accordance with one aspect of the present invention, the attainment of this object results from the realization that operators of large, fast-moving aircraft must be apprised of the presence of small, relatively slow and less expensive aircraft to a greater extent than the pilot of small aircraft need know the whereabouts of the larger aircraft. Large aircraft move at a velocity frequently five times in excess of that of the small aircraft and operators thereof must, therefore, take evasive action considerably before such action is necessary by a small aircraft pilot. Further, a large aircraft operator is often incapable of obtaining a visual sighting on a small aircraft in sufficient time to exercise evasive actions, while the small aircraft pilot is usually better able to see the large aircraft because of optical considerations. In addition the small aircraft pilot can take evasive actions more readily than the large aircraft pilot because the small craft flies at a much lower velocity and is frequently more maneuverable.

To enable the primary object of the present invention, set forth supra, to be achieved, every aircraft within a region being monitored, such as 1400 miles in radius, is provided with a relatively inexpensive transceiver responsive to a stable reference frequency transmitted from a synchronous earth satellite. The stable frequency is received by the transceiver on each aircraft and used to modulate a high-frequency carrier that is transmitted, i.e., relayed, to other aircraft which may be in a predetermined area defining a collision avoidance zone, having a radius controlled by the pilot on the order of 1 to 15miles. If a complex, high-speed, large aircraft is within the collision avoidance zone, the signal relayed from the transceiver of another or second aircraft within the zone is received and detected by apparatus on the large aircraft. Detection involves extracting the Doppler frequency shift imposed on the carrier relayed to the large aircraft by the transceiver of the second aircraft due to the velocity vector between the two aircraft. The Doppler frequency rate of change is detected, utilizing either aural or electronic methods and apparatus, to indicate a collision course between the two aircraft. If the Doppler frequency rate of change is zero, or substantially zero, an indication is provided that the aircraft are on a collision course.

While Doppler frequency rate of change detecting techniques and systems have been previously developed for collision avoidance purposes, none has employed a synchronous satellite for establishing a stable reference frequency. A synchronous satellite for transmitting a stable reference frequency is of particular advantage because it eliminates the need for a highly stable source of each aircraft, thereby reducing the complexity and expense of the electronic equipment which must be included on all aircraft, including inexpensive, general aviation craft. Since the statistical probability is more than 10 to 1 of a collision occurring between commercial and general aviation aircraft and these collisions are occurring with regularity, usually with total disaster resulting, a useful collision avoidance system should provide protection against collisions of these diverse aircraft types. Of course, in a system utilizing Doppler frequency techniques, a stable reference frequency of known characteristics must be employed to enable precise Doppler frequency shift data to be derived.

To establish a stable reference frequency for the transceiver of each aircraft in a region being monitored, the Doppler shift on the reference carrier received on each aircraft must be negligible despite aircraft position heading and velocity within the region. Doppler effect in the satellite to aircraft transmission link can be made negligible by employing one satellite for relatively small regions on the surface of the earth. For example, one satellite is limited in utility to an area approximately equal to the Continental United States. If the single satellite is used its optimum location is along a local vertical extending as near as possible through the geographic center of the Continental United States. Typically, the radius of the region covered by the satellite is approximately 1400 miles, a coverage area translated into ±0.0061 radians from the satellite relative to the local vertical thereof. A coverage angle on this order of magnitude enables the Doppler frequency shift of transmission from the satellite to the aircraft in the region to be monoitored to be substantially negligible. The Doppler frequency shift in the satellite to aircraft link can be reduced additionally by decreasing the coverage area for a single satellite.

In accordance with one embodiment of the present invention, the collision indicating Doppler frequency phase shift resulting from transmissions between aircraft is detected on the large aircraft by comparing the phase of the signal received on the large aircraft, as relayed from the second aircraft, with the satellite stable reference frequency. The Doppler frequency shift is preferably extracted in a phase locked loop responsive to transmission from the second aircraft and the satellite stable reference frequency. The phase locked loop includes the usual voltage controlled oscillator so that if any drifting in the source being modulated on the second aircraft occurs, it is automatically compensated.

In accordance with still another aspect of the invention, the stable, reference frequency transmitted from the satellite is periodically modulated by a range synchronizing (sync) or timing pulse. The sync pulse is received by each aircraft at substantially the same time in a collision avoidance zone. Simultaneous reception of the sync pulse on each aircraft in the zone occurs because the zone typically useful has a 15 mile radius, while the distance between the satellite and aircrafts within the zone is approximately 23,000 miles. Further, the sync pulse time position and phase of signals transmitted from the satellite and received on the aircraft can be varied as a function of altitude to assure a common time base reference for all aircraft regardless of altitude to provide effective simultaneous sync pulse reception. The pulse is received on each aircraft and transmitted to other aircraft in the collision avoidance zone. By measuring the time separation between altitude corrected sync pulses received from the satellite and adjacent aircraft, the range between the aircraft can be ascertained.

A further feature relating to the sync pulses is that the receiver on each aircraft can be blanked to be unresponsive to aircraft beyond the collision avoidance or warning zone. Blanking the receiver so that it is unresponsive to aircraft beyond the collision warning zone is important so that the aircraft operator will be confused in response to signals relayed from aircraft that do not constitute a collision threat. Blanking is performed by delaying the received sync pulse from the synchronous satellite by a time interval commensurate with the aircraft collision warning zone. In response to the delayed sync pulse being generated, that portion of the transceiver responsive to signals from other aircraft is switched to an inactive state.

Another feature of the present invention is that no a priori knowledge is required of identification characteristics of transmissions from other aircraft within the region being monitored by a satellite. This feature is attained by time sharing the same carrier frequency amongst all of the aircraft in the monitored region and pulse width modulating the signal transmitted from each aircraft, either on a coded or random basis. The probability of two aircraft being in the same collision avoidance zone having the same time division modulation scheme simultaneously is believed so remote with either of these coding techniques as to be virtually non-existent. In the event, however, that additional reduction of probability is deemed necessary, coding for each aircraft could be assigned at the time of take off by a governmental regulatory body.

An additional object of the present invention, therefore, is to provide a new and improved method of and system for establishing a Doppler frequency reference to be employed in conjunction with vehicle collision avoidance systems.

Another object of the present invention is to provide a new and improved method and system for determining the ranges between a plurality of objects, each of which includes a transceiver responsive to a timing pulse transmitted from a synchronous satellite and a timing pulse relayed from the satellite through other objects.

An additional object of the present invention is to provide, in a vehicle collision warning system, apparatus for eliminating the deleterious effects of signals from vehicles outside of a collision warning zone.

Still a further object of the present invention is to provide a vehicle collision warning system, of the cooperative type, wherein no a priori knowledge regarding identification characteristics of signals transmitted from other vehicles in a collision warning zone is required.

Still a further object of the present invention is to provide a vehicle collision warning system wherein certain vehicles in a region being protected need only include a transceiver responsive to a stable reference frequency transmitted from a synchronous, earth satellite, and retransmitting a useful replica of the satellite signal as modulation on a preassigned collision avoidance system frequency.

The above and still further objects, features and advantages of the present invention will become apparent upon consideration of the following detailed description of several specific embodiments thereof, especially when taken in conjunction with the accompanying drawings, wherein:

FIG. 2 is a block diagram of the equipment contained in a relatively large aircraft, in accordance with one embodiment of the present invention;

Figure 1:
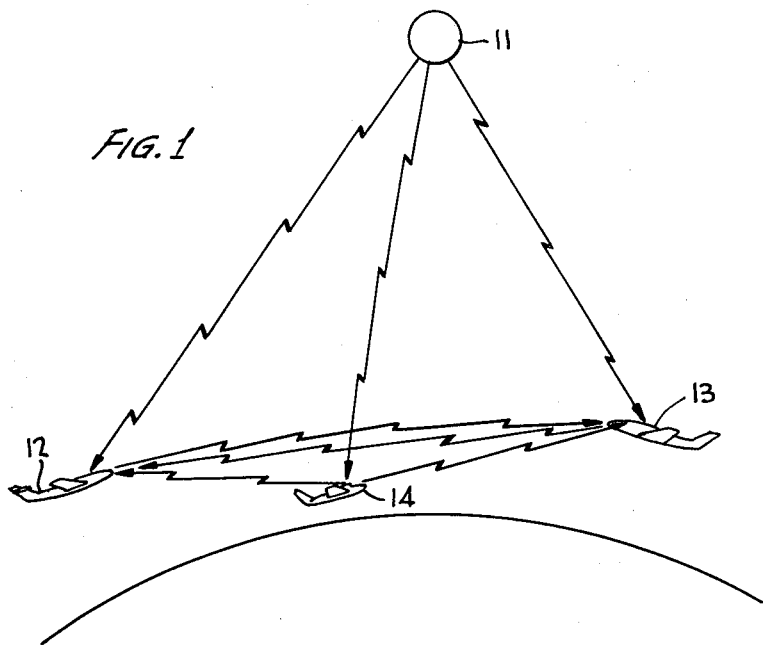
FIG. 1 is a schematic diagram illustrating the principles of the present invention, particularly applied to aircraft collision avoidance systems.

Reference is now made to FIG. 1 of the drawings wherein an artificial, synchronous earth satellite 11 is illustrated. Satellite 11 is positioned at a substantially stationary point relative to the surface of the earth, for example, above an equatorial subsatellite point at the geographical center of the United States, at an altitutde of approximately 22,000 miles, whereby it has a rotational velocity equal to the rotational velocity of the earth. Satellite 11 includes, inter alia, means for transmitting a stable reference frequency, in the aircraft communication VHF spectrum. The stable, reference frequency transmitted from satellite 11 can originate on the satellite or be relayed through the satellite via a transceiver contained thereon and responsive to transmissions originating on earth. The signal transmitted from satellite 11 has constant frequency and phase regardless of satellite translation and/or rotation, a result that can be achieved by known electronic techniques, if necessary.

A line of sight communications link, at the stable, reference frequency, exists between satellite 11 and aircrafts 12–14. Aircrafts 12 and 13 are of the relatively large, high speed type, while aircraft 14 is of the low speed, general aviation type. Included on each of aircrafts 12–14 is a transceiver, having a receiver portion tuned to the stable reference frequency transmitted from satellite 11.

Only these aircraft in a relatively small region on earth, substantially less than the possible field of view of the VHF signal transmitted from satellite 11, have receivers tuned to the stable reference frequency transmitted from the satellite. The relatively small region typically has a radius of approximately 1400 miles from the subsatellite point to define a monitoring region slightly smaller than the continental United States. Thereby, a relatively small angle of ±0.0001 radians is subtended between the satellite local vertical and the edge of 1400 mile radius region monitored by the satellite. If the monitored region were extended materially beyond the stated area, the angle between the aircraft and the line of sight path of the signal received thereby from the satellite would be large enought, in certain instances, to cause Doppler frequency shifts in the reference, stable frequency received by certain of the aircraft. By constraining the monitored region to the stated radius, however, it can be validly assumed that the Doppler frequency shifts of the satellite radio signal received on each aircraft tuned to the satellite stable reference frequency are negligible, regardless of the aircraft attitude, altitude or velocity. While aircrafts at different altitudes within the collision avoidance zone receive the satellite reference frequency with different phases as a function of altitude, this phase shift can be compensated in a facile manner utilizing a variable phase shifter, having a setting responsive to aircraft altitude, as described in more detail infra.

Each of the aircrafts 12–14 is considered to be within a 15 mile radius of each other, whereby each is in a collision avoidance zone. Contained on each of the aircrafts 12–14 is a transceiver responsive to the stable reference frequency generated by synchronous satellite 11. The transceiver on each of aircrafts 12–14 responds to the stable, reference frequency received thereby from the satellite. The received reference frequency modulates an ultra high frequency (UHF) carrier frequency transmitted by an omnidirectional antenna to each of the other aircrafts within the collision avoidance zone. Each of aircrafts 12 and 13, being relatively large, high speed, complex and expensive, includes a receiver for the high frequency energy transmitted from the other aircrafts within the collision warning zone, while relatively small, slow speed and inexpensive aircraft 14 need not include an aircraft to aircraft collision detector responsive to a UHF receiver.

While the satellite to aircraft and aircraft to aircraft radio links are identified, for convenience, as having VHF and UHF carriers, it is to be understood that other suitable frequency bands can be employed. The exact frequencies selected for those carriers depend upon desired instrument sensitivity and must ultimately be determined by a governmental regulatory body. The important consideration is to establish suitable frequency bands for the satellite to aircraft link and for the aircraft to aircraft link.

Figure 3:
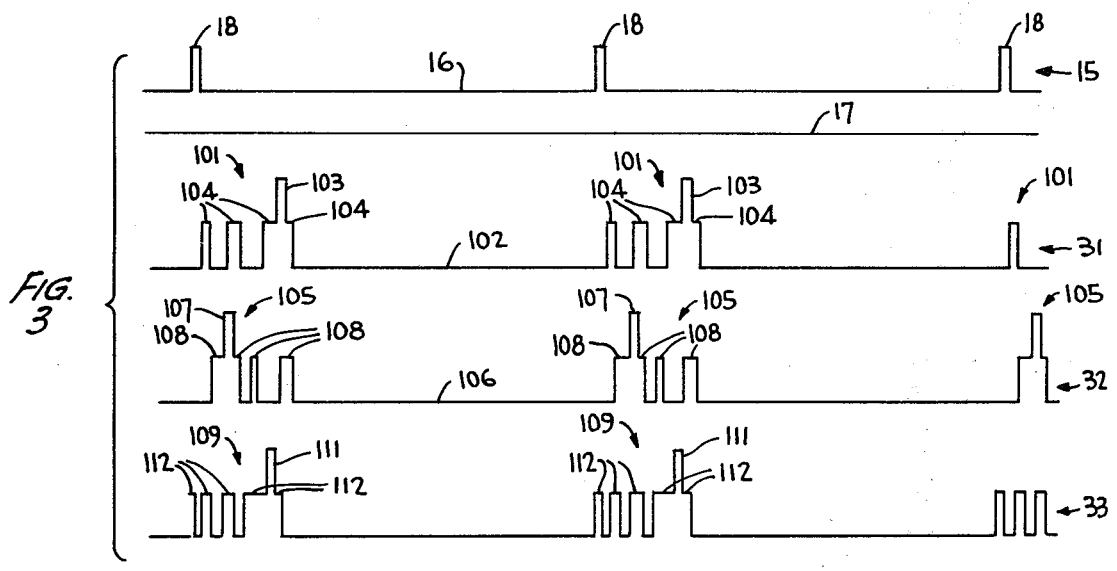
FIG. 3 are wave forms helpful in describing the operation of the present invention.

The signal transmitted from synchronous satellite 11 is a stable, reference frequency, with sufficient stability to be utilized as a reference for Doppler frequency extraction. Waveform 15, FIG. 3, illustrated the amplitude of the signal transmitted from synchronous satellite 11, and normally has a constant, finite value, indicated by straight line portions 16 above zero or base line 17. Periodically, at intervals separated by 300 microseconds, for example, short duration sync pulses 18 (on the order of 10 microseconds), having an amplitude of approximately two to four times the normal amplitude of waveform portions 16 modulate the stable r.f. signal transmitted from satellite 11.

Sync pulses 18 enable the relative ranges of aircrafts 12–14 to be determined on the high speed aircrafts 12 and 13 and initiate control functions in the high frequency receivers of high speed aircrafts 12 and 13. In one embodiment of the invention, sync pulses 18 establish a time base for code generators on each of aircrafts 12–14, enabling all of the aircrafts to communicate with each other via a common frequency, utilizing time sharing techniques.

Reference is now made to FIG. 2 of the drawings wherein there is illustrated a block diagram of the apparatus included on one of aircrafts 12 or 13, in accordance with one embodiment of the present invention. The apparatus included on aircraft 14 is substantially identical to only a segment of the apparatus included on aircrafts 12 and 13. The apparatus included on aircrafts 12 and 13 comprises a transceiver section 21 and detection section 22, while aircraft 14 includes only a transceiver, similar in virtually all respects to transceiver 21 illustrated. For this reason, no detailed description of the apparatus contained on aircraft 14 is provided but mention is made in the description of FIG. 2 when a difference between the two transceivers occurs.

Considering now the transceiver section 21 of a relatively large, high speed and expensive aircraft, there is provided a high gain, antenna 23 responsive to the VHF stable reference frequency signal transmitted from synchronous satellite 11. Antenna 23 is of the high gain, and therefore directional type, to eliminate signals from ground sources.

The signal transduced by high gain antenna 23 is coupled to VHF band pass filter 24, having a center frequency coincident with the stable reference frequency transmitted from satellite 11. Filter 24 has a very high Q since it need pass only the stable reference frequency, which is not subject to variation regardless of aircraft attitude or velocity.

The stable, reference frequency output of bandpass filter 24 is fed to r.f. amplifier 25 which drives variable phase shifter 26, which functions effectively as a delay line. The setting of phase shifter 26 is adjusted in response to an output of altimeter 227 so that the phase of the stable, reference frequency derived by the phase shifter on each of aircrafts 12–14 is substantially identical as related to a predetermined base altitude for all aircraft, regardless of the relative altitude of the several aircraft, Hence, the phase of the VHF carrier modulation and timing pulse derived from phase shifter 26 on each of aircraft 12–14 is identical, whereby the occurrence time of sync pulses 18 generated on each of the aircraft is identical.

The output of variable phase shifter 26 is applied in parallel to mixer 27 and sync pulse detector 28. Sync pulse detector 28 responds to each of the pulses 18 in waveform 15, FIG. 3, to derive constant amplitude pulses, having a fixed duration equal to a standard duration for each of pulses 18.

Pulses generated by sync pulse detector 28 are fed to code generator 29, in accordance with one embodiment of the present invention. Code generator 29 is different for each of the aircrafts and includes means for generating a pulse width modulated binary wavetrain, portions of which are indicated by waveforms 31–33 of FIG. 3. In response to each occurrence of a sync pulse output of detector 8, code generator 29 generates a pulse width modulated binary wavetrain having a total duration equal to the time separation between adjacent ones of pulses 18. (For reasons seen infra, only portions of the pulse width modulated wavetrains are illustrated by waveforms 31–33, FIG. 3.) Code generator 29 on each of the aircrafts, however, is arranged to generate a binary one level simultaneously with the derivation of a sync pulse at the output of detector 28, and for a short period (e.g., two or three microseconds) on either side thereof. In response to each occurrence of a sync pulse at the output of detector 28, code generator 29 generates exactly the same wavetrain as was derived in response to the previous output of the sync pulse detector, with the wavetrains derived by code generators 29 being different for each of aircrafts 12–14.

The output of code generator 29 selectively gates through switch 36 to mixer 27 the output of local crystal oscillator 35, having frequency in the UHF range which is designed to be identical for each of the aircraft. In response to a binary one level being derived from code generator 29, switch 36 is closed to pass the UHF output of oscillator 25 to mixer 27. Oscillator 35 need not be of the highly stabilized type but can be subject to drift normally attendent with typical, nondrift compensated crystal oscillators. It is not necessary to employ a stabilized source for oscillator 35, even though Doppler measurements are to be performed, because the stable frequency fed to each of the aircrafts 12–14 by synchronous satellite 11 is employed as a reference for the Doppler extractions necessary.

While code generator 29 functions admirably to establish the opening and closing of switch 36, it is to be understood that the function of the code generator can be attained with a random pulse generator, such as a Schmidt trigger responsive in parallel to a noise source, which may be a radioactive alpha ray source, and the output of detector 28. If a random source is substituted for the code generator to control the coupling of local oscillator 35 to mixer 27, statistical theory shows that the probability of establishing mutually exclusive time shared channels between aircrafts 12–14 is virtually 1.0. To reduce further the probability of two adjacent aircraft generating the same code, coding can be assigned at the time of take-off.

In response to the closing of switch 36, the pulse code modulated UHF carrier generated by oscillator 35 is heterodyned with the stable, reference frequency derived from phase shifter 26 in mixer 27. The output of mixer 27 is fed to bandpass filter 37, having a pass band centered about the sum of the UHF local oscillator and VHF reference frequencies to derive a single sideband UHF signal.

The amplitude modulated, single sideband wave derived from bandpass filter 37 is fed via power amplifier 38 and directional coupler 39 to omnidirectional UHF antenna 41. Directional coupler 39 provides isolation between the high power output of amplifier 38 and UHF energy received by antenna 41 and coupled to the input of detector 22. Because detector 22 is not included on aircraft 14, the need for directional coupler 39 on that aircraft is obviated, enabling UHF, omnidirectional antenna 41 to be connected directly to the output of power amplifier 38.

Consideration is now given to the detector responsive to the UHF signals transmitted from aircraft 12–14, which detector is included on each aircraft 12 and 13. Detector 22, broadly, responds to the VHF satellite stable reference frequency, as transduced by antenna 23, and the UHF signal transmitted from other aircrafts in the collision avoidance zone, as transduced by antenna 41. Detector 22 responds to the sync pulses modulated on the UHF and VHF carriers to derive an indication of relative range between aircraft. Further, the Doppler frequency shift imposed on the UHF carrier is compared against the VHF stable reference frequency to derive an indication of probable inpending collision, derived by sensing the rate of change of the UHF Doppler frequency shift received on the aircraft.

To these ends, detector 22 includes one or a plurality of parallel channels, the number thereof being equal to the largest number of aircrafts expected in the collision avoidance zone. For purposes of simplifying the description of the present invention, the details of only channel 51 are described and illustrated, while a second channel 52 is shown in block form. It is understood that the apparatus included within channel 52 is very similar to that included within channel 51, with differences being shown by boxes wherein the former, and that additional parallel channels can be added at will.

To control signal coupling to channels 51 and 52, channel selection network 53 is provided. The details of channel selector control network 53 are described infra, after a detailed description of channel 51 has been presented. At the present time, suffice it to say that channel selector network 53 enables channel 51 in response to UHF transmissions being received from a first aircraft in the collision avoidance zone, while channel 52 is enabled in response to a second aircraft being in the collision avoidance zone, while channel 51 is enabled. If the aircraft being monitored by channel 51 moves out of the collision avoidance zone, channel 51 continues to track the second aircraft and channel 51 is disabled, awaiting the intrusion of another aircraft into the collision avoidance zone.

Each of channels 51 and 52 is supplied with UHF energy from other aircrafts in the collision avoidance zone in response to the output of directional coupler 39, as coupled through switch 54. The isolation provided by directional coupler 39 is sufficient to decouple substantially all of the energy from power amplifier 38 to switch 54, whereby the input to the switch can be considered as being derived only from other aircrafts in the collision avoidance zone.

Switch 54 is activated to the closed state to pass the output of directional coupler 39 in parallel to the inputs of channels 51 and 52 in such a manner that UHF signals from aircrafts outside of the collision avoidance zone are not fed to channels 51 and 52. To this end, switch 54 is closed only for a time period subsequent to the reception of VHF sync pulses by the aircraft, transmitted from satellite 11, equal to a time commensurate with the propagation time of electromagnetic energy within the aircraft collision avoidance zone. Closure of switch 54 for the stated interval is attained by feeding the output of sync pulse detector 28, in the VHF transceiver channel 21, through pulse stretcher 225 to switch 54. Pulse stretcher 255 responds to the short duration output of sync detector 28 to derive a constant positive amplitude, relatively long duration pulse, having a width commensurate with the desired radius of the aircraft collision avoidance zone. If it is desired to change the radius of the aircraft collision avoidance zone, the width of the pulse derived by stretcher 225 may accordingly be varied at will by the aircraft pilot as the plane moves from a congested area to enroute conditions. The output of pulse stretcher 255 is applied as an input to switch 54, to close the switch for a duration equal to the length of the constant positive amplitude pulse generated by the pulse stretcher.

By closing switch 54 only for a time period subsequent to the reception of a sync pulse from satellite 11 equal to the propagation time of electromagnetic energy within the radius of the collision avoidance zone, detector 22 is unresponsive to aircraft outside of the zone. Detector 22 is unresponsive to aircraft of the zone because switch 54 is open during the interval between the termination of a pulse derived by stretcher 255 and the reception of the following sync pulse from satellite 11, to decouple channels 51 and 52 from the signals received by antenna 41. By providing a period of approximately 300 microseconds between adjacent sync pulses, the maximum distance of the collision avoidance zone is set at approximately 50 miles. UHF energy transmitted by aircrafts greater than 50 miles from the aircraft carrying detector 22 is absorbed sufficiently to prevent detection. Detector 22 is thereby rendered responsive only to those aircraft within the collision warning or avoidance zone and there is no problem of overlap with aircraft that are far outside of the zone.

As indicated supra, for purposes of the present description, it is assumed that channel 51 is enabled, resulting in output of switch 54 being coupled through switch 55 of channel 51 to the input of phase locked demodulator loop 56. Phase locked demodulator loop 56 includes mixer 57, responsive to the UHF signal fed through switch 55, as well as a variable frequency output of voltage controlled oscillator 257. The center frequency of oscillator 257 equals the frequency of UHF local oscillator 35, common to each aircraft 12–14, whereby mixer 57 derives an IF difference frequency that is substantially equal to the VHF signal transmitted from satellite 11 and is a replica of the UHF signal received by antenna 41, with regard to both amplitude and frequency. Hence, as the frequency and amplitude of the UHF signal received by antenna 41 vary, corresponding changes in the frequency and amplitude of the difference frequency generated by mixer 57 occur. The difference frequency ouptut of mixer 57 is amplified and filtered from the remainder of the output of mixer 57 by IF network 58. IF network 58 comprises the loop filter and has a center frequency equal to the stable VHF reference frequency transmitted from satellite 11 and sufficient bandwidth to pass Doppler frequency shifts imposed on the UHF carrier received by the aircraft.

The output of IF network 58 is applied in parallel to amplitude limiter 59 and sync detector 61. Sync detector 61 responds to the large amplitude sync pulses in the output of IF amplifier 58 and feeds them to pulse time interval measuring circuit 62. Pulse time interval measuring circuit 62 also responds to the output of sync detector 28 to measure the time interval between the reception of a VHF sync pulse received from satellite 11, as derived from the output of variable phase shifter 26, and the occurrence time of a UHF sync pulse received from another aircraft in the collision avoidance zone. Circuit 62 derives an analog output having an amplitude indicative of the time interval between the VHF satellite and UHF aircraft sync pulses and hence commensurate with the range between the aircraft on which detector 22 is located and the aircraft which transmitted the UHF energy being processed by channel 51. The analog output of measuring circuit 62 is fed to range indicator 63 to provide an operator of the aircraft on which detector 22 is located with an indication of the relative range between the two aircrafts.

To extract the Doppler frequency shift of the UHF carrier received by antenna 41, the output of IF stage 58 is fed to limiter 59 which removes the sync pulses on the received UHF carrier, and derives a constant amplitude output, regardless of variations in the signal strength of the received UHF energy. The output of limiter 59 is fed to mixer 64, having a second input responsive to the stable reference frequency transmitted from satellite 11 and received on the aircraft. The stable reference frequency coupled to mixer 64 is derived from the output of variable phase shifter 26 and amplitude limiter 65, that removes the sync pulses from the stable reference frequency, and stabilizes the amplitude of the reference frequency. By amplitude limiting both inputs to mixer 64, intermodulation distortion in the output of mixer 64 between the stable VHF reference frequency and the replica of the UHF wave transmitted from the aircraft being tracked by channel 51 is obviated.

The center frequency of oscillator 257 is selected so that with a zero Doppler frequency shift imposed on the UHF wave received by antenna 41, the inputs to mixer 64 have identical frequencies. Under these conditions, the output of mixer 64 includes a d.c. component indicative of the relative phase shift between the VHF inputs thereof. In response to the aircraft containing detector 22 and the aircraft assigned to channel 51 having a different relative velocity, mixer 64 derives a difference frequency output indicative of the relative velocities between the two aircrafts.

The d.c. or difference frequency output of mixer 64 is fed through low pass filter 265 to the exclusion of other frequencies generated by mixer 64. Low pass filter 265 and IF network 58, together, are constructed, in a manner well known to those skilled in the art to provide phase locked loop 56 with a first order loop filter. As will be apparent to those skilled in the art, filter 265, for such a loop filter, derives a d.c. error voltage of finite amplitude proportional to the relative phase of the inputs to mixer 64 in response to a zero Doppler frequency shift on the UHF carrier received by antenna 41. For a stabilized, constant Doppler frequency shift on the carrier received by antenna 41 the output of filter 265 is an audiowave equal in frequency to the shift. As the received Doppler frequency changes, corresponding variations in the frequency derived from filter 265 occur. Hence, low pass filter 265 generates an output that is a replica of the Doppler frequency shift on the UHF carrier received by antenna 41. Filter 265 smoothes pulses which occur in response to the on-off action of switch 54 and the coding on the modulation envelope transmitted from other aircraft in the wave train generated by mixer 64 and decouples all outputs of the mixer other than the difference frequency. The Doppler shift frequency dwells in filter 265 for a sufficient time period to enable the filter to generate a tone which is a replica of the Doppler frequency shift. The high frequency, pulse transitions imposed on the tone cannot dwell in the filter and are thereby rejected by it. The low frequency output of filter 265 is applied as the control input to voltage controlled oscillator 257 which thereby tracks the frequency variations on the UHF carrier received by antenna 11.

Phase locked loop 56 for detecting variations on the carrier frequency of the UHF energy received by antenna 41 is particularly advantageous because the low frequency, long duration frequency shifts in the transmitted UHF signals from other aircraft within the collision avoidance zone, which result from drifting of local oscillator 35, can be tracked, without affecting substantially the rate of change of the output of low pass filter 265 relative to Doppler frequency shifts induced by the relative velocity between the aircraft. Further, proper selection of the center frequency of voltage controlled oscillator 257 enables the two inputs to mixer 64 to have the same nominal center frequency.

To detect impending collisions between the aircraft carrying detector apparatus 22 and the aircraft being monitored by channel 51, the rate of change of the Doppler frequency shift output of low pass filter 265 is detected. If the rate of change of the Doppler frequency shift is substantially zero, an indication is provided that the two aircrafts are on a collision course.

The simplest and least expensive manner for detecting the rate of change of the output frequency of low pass filter 265 is to provide an aural indicator. To this end, the output of low pass filter 265 is applied to audio amplifier 66, which feeds headphones 67. An operator listening to headphones 67 is able to discern changes in the pitch of the audio frequency wave derived by low pass filter 265, as coupled through audio amplifier 66, to a great degree. Hence, as long as an operator utilizing headphones 67 hears a whining, changing pitch, he is apprised of a no-collision condition between his aircraft and the aircraft being monitored by channel 51. If, however, the pitch of the tone fed to headphone 67 by channel 51 should become constant, the operator is provided with an indication that the crafts are on a collision course.

When an aircraft first enters the collision avoidance zone, the tone of headphones 67 may appear to be of constant pitch because the relative rate of change between aircrafts having a relatively large separation may not be appreciable. Hence, if when a tone is first heard it has no perceptible change in pitch, the operator should observe range indicator 63. If range indicator 63 provides a visual indication that the separation between the aircraft being monitored by channel 51 is at the periphery of the collision avoidance zone, the operator of the aircraft need not take immediate evasive action. If, however, the tone derived by headphones 67 is constant for a period of, for example, ten seconds, the operator should continue to observe range indicator 63 and if the two aircraft are approaching each other, as indicated by the range indicator, evasive action should be commenced.

To avoid some of the annoyances which may be associated with a constant tone or a plurality of tones derived from an aural indicator, an electronic system for processing the rate of change of the output of low pass filter 265 is provided. Broadly, the electronic processor includes means for detecting the presence of a finite output of low pass filter 265, in combination with means for detecting the rate of change in frequency of the low pass filter output.

To detect the presence of an output from low pass filter 265, the filter output is applied to detector 68, of the standard amplitude modulation, diode type. Detector 68 derives an output signal proportional to the amplitude of the signal derived from the output of low pass filter 265. Detector 68 includes an integration network having a relatively long buildup time constant and a short duration discharge time constant. Thereby, a relatively large amplitude output is derived by detector 68 only after a finite signal has been generated at the output of low pass filter 265 for a relatively long time interval, on the order of ten seconds. The output of detector 68, however, quickly falls to zero, in less than a second, in response to the output of low pass filter 265 having a zero amplitude. Thereby, detector 68 derives a relatively large amplitude output only in response to channel 51 monitoring another aircraft in the collision avoidance zone for at least ten seconds.

The output of detector 68 is applied to infinite limiter 69. Limiter 69 generates a bilevel finite value in response to the output of detector 68 being less than a threshold value, associated with channel 51 monitoring an aircraft for ten seconds or more. Limiter 69 derives a zero level output in response to the output of detector 68 being above the threshold value. Thereby, limiter 69 derives a bilevel signal having zero and finite levels respectively indicative of the presence or absence of an aircraft being monitored by channel 51. Because of the long buildup time constant for the integration network included within a.m. detector 68, the possibility of finite limiter 69 deriving a spurious output indicative of an aircraft being monitored by channel 51 or an indication being provided that an aircraft is in the collision avoidance zone, when in fact the aircraft merely passes through the zone briefly, is virtually obviated.

To provide an indication of the rate of change in the output of low pass filter 265, the filter output is fed to FM detector 71. Detector 71 generates a d.c. output signal proportional in amplitude to the frequency derived by filter 265. The variable amplitude output of detector 71 is fed to electronic differentiating network 72, the output of which is proportional to the rate of change of the output frequency of filter 265, hence indicative of the Doppler frequency change of the aircraft carrying detector 22 and the aircarft monitored by channel 51. The output of differentiating circuit 72 is applied to infinite limiter 73, which derives a binary zero level in response to a substantially zero amplitude output of differentiator 72 and a binary one level in response to the output of differentiator 72 being above a threshold commensurate with a very low frequency shift of, for example, one Hertz. If, thereby, there is substantially no Doppler frequency shift in the carrier of the UHF energy received by antenna 41 resulting from the relative velocity of the aircraft being monitored by channel 51 and the aircraft carrying detector 22, a zero output is derived by limiter 73, indicative of a collision course. Because local oscillator 35 on each aircraft drifts at a much slower rate than the Doppler frequency can shift, and the threshold of limiter 73 is selected greater than the drift frequency, drift of the local oscillator does not affect the output of limiter 73. If the aircraft being monitored by channel 51 is moving on a noncollision course with the aircraft carrying detector 22, whereby a finite output is derived from differentiator 72, infinite limiter 73 generates a binary one output.

The binary outputs of infinite limiters 69 and 73 are combined to provide visual indications of the presence of another aircraft in the collision warning zone, as well as visual and aural indications of the possibility of a collision, as detected by the rate of change of Doppler frequency shift. To provide an impending collision indication, the outputs of limiters 69 and 73 are applied directly to NAND gate 74. If both inputs to NAND gate 74 are binary zero levels, indicative of the aircraft monitored by channel 51 being within the collision warning zone, and having a zero Doppler frequency shift with regard to the plane carrying detector 22, NAND gate 74 derives a binary one output. The binary one output of NAND gate 74 energizes visual indicator 75, a red lamp, and an aural indicator 76, a buzzer having a loud tone annoying to the operator so that he will direct his attention to it. In response to visual and aural indicators 75 and 76 being activated, the pilot should commence to take evasive action immediately to avoid a midair collision with the aircraft being monitored by channel 51.

To provide a visual indication that another aircraft is in the collision warning zone being monitored, but that the aircraft is not on a collision course with the aircraft containing detector 22, the binary output of infinite limiter 73 is fed through inverter network 77 to NAND gate 78, where it is combined with the output of limiter 69. In response to an aircraft being detected by channel 51 having a Doppler frequency rate of change relative to the aircraft containing detector 22, NAND gate 78 derives a binary one output. The binary one output of NAND gate 78 activates visual indicator 79, a green lamp, to provide the aircraft operator with an indication that another aircraft is within the collision warning zone but that the two aircrafts are not on a collision course.

Consideration is now given to the circuitry included within channel selector 53. It is the function of channel selector 53 to activate one of channels 51 or 52 in response to each aircraft within the channel collision avoidance zone. Selector 53 activates channels 51 and 52 in response to the sync pulses modulated on the UHF carriers transmitted from the different aircrafts in the collision avoidance zone. In response to a pair of sync pulses from the same aircraft being received on the aircraft containing detector 22, selector network 53 opens the switch 55 of one of channel selectors 51 or 52. The switch 55 remains open until sync pulses from the aircraft are no longer being received. A pair of aircrafts can be simultaneously tracked by channels 51 and 52 because each channel includes, in effect, a frequency responsive network for passing only the Doppler frequency associated with one aircraft. This result is attained because of the phase locked loop 56 included within each of channels 51 and 52.

Considering the channel selector 53 in greater detail, the output of switch 54 is applied to sync detector 81, which derives a constant amplitude, short duration pulse having a predetermined amplitude and a length equal to a standard duration for each sync pulse received by antenna 41. The short duration pulses derived by sync detector 81 are applied in parallel to AND gate 82 and delay network 83. Delay network 83 has a delay time commensurate with the interval between adjacent sync pulses, as transmitted from synchronous satellite 11, and generates output pulses having duration and amplitude equal to the amplitude and duration of pulses derived from sync pulse detector 81.

In response to an aircraft being within the collision avoidance zone for a time period greater than 300 microseconds, virtually identical pulses are simultaneously derived from the outputs of sync pulse detector 81 and delay network 83. This condition is detected by applying the outputs of sync pulse detector 81 and delay network 83 to the input of AND gate 82. Detection of an aircraft leaving the collision avoidance zone is provided by a binary one signal being derived by AND gate 84, responsive to the output of delay network 83 and an inverted replica of the output of sync pulse detector 81, derived from inverter 85. Recapitulating the functioning of AND gates 82 and 84 for each aircraft within the collision avoidance zone, AND gate 82 derives an output pulse within the interval between adjacent satellite sync pulses. If an aircraft leaves the collision avoidance zone between adjacent sync pulses, a binary one is derived from AND gate 84.

To select activation of channels 51 and 52 in response to the outputs of AND gate 82, it is assumed that two aircrafts will not enter the collision avoidance zone within the 300 microsecond period between a pair of adjacent sync pulses. From physical considerations, this is obviously a valid assumption. The first aircraft entering the collision avoidance zone is monitored by channel 51, while the second aircraft entering the zone is monitored by channel 52.

To selectively activate channels 51 and 52, the output of AND gate 82 is applied in parallel to AND gates 91 and 92, which feed set inputs of flip-flops 93 and 94, respectively. Each of flip-flops 93 and 94 is of the conventional type, including set and reset inputs, and a pair of complementary outputs, respectively designated as one and zero. In response to the set input of the flip-flops being energized, a binary one level is derived from the one output of the flip-flop, while a binary one signal is derived from the zero output of the flip-flops in response to the reset input being activated.

The zero outputs of flip-flops 93 and 94 are fed to input terminals of AND gates 91 and 92, respectively. In addition, the zero output of flip-flop 93 is fed through inverter 195 to an input of AND gate 92. Thereby, flip-flop 93 is activated to the one state in response to the first aircraft coming within the collision avoidance zone, while flip-flop 94 is activated to the one state in response to a second aircraft coming within the collision avoidance zone. No provision is provided in the present, exemplary circuit for processing data from more than two aircrafts within the collision avoidance zone, whereby a connection is established between the zero output of flip-flop 94 and the input of AND gate 92.

If, however, it is desired to monitor more than two aircraft within the collision avoidance zone, the zero output of flip-flop 94 would be connected to the input of a further inverter which would feed an additional AND gate responsive to the output of AND gate 82 and a further flip-flop would be provided. A string of similar inverters, AND gates and flip-flops would be added as desired for increasing the collision avoidance capacity of the present apparatus.

The one output of flip-flop 93 is applied as an enable input to switch 55 of channel 51. In response to the set input of flip-flop 93 being activated, whereby a binary one signal is derived from the one output of the flip-flop, switch 55 of channel 52 is closed to enable the output of switch 54 to be coupled to phase locked loop 56. The one output of flip-flop 94 is fed to a similar switch 55 included within channel 52 for the same function. Channel 52 includes a pulse time interval measuring circuit similar to the measuring circuit 62 included within channel 51, and the measuring circuit of channel 52 is responsive to the output of sync pulse detector 28, included in the tranceiver 21. Channel 52 also includes a mixer similar to mixer 64 and responsive to the stable reference frequency output of limiter 65.

To deactivate channel 51 when the aircraft it is monitoring moves outside of the collision avoidance zone, the output of AND gate 84 is combined with the output of sync detector 61, as coupled through pulse stretcher 295, which generates a pulse having a duration slightly less than the interval between adjacent sync pulses so that the pulse stretcher output does not vary as long as the aircraft being monitored by channel 51 is within the collision avoidance zone. When the aircraft moves outside of the zone the output of pulse stretcher drops while a sync pulse replica is being derived from delay network 83. The trailing edge of the output of pulse stretcher 295, resulting from the aircraft leaving the collision avoidance zone, is sensed by differentiator and detector network 95, which generates a pulse in response thereto. The output pulse of network 95 occurs simultaneously with the output of AND gate 84 only when the aircraft monitored by channel 51 leaves the collision avoidance zone. The detect the simultaneous occurrence of pulses generated by network 95 and AND gate 84, the outputs thereof are combined in AND gate 96.

The binary one output of AND gate 96 is fed to the reset input of flip-flop 93. In response to activation of the reset input of flip-flop 93, a binary zero level is derived from the one output thereof to open circuit switch 55 and decouple phase locked loop 56 from the output of switch 54. Thereby, channel 51 is effectively decoupled from the aircraft it was monitoring and the aircraft is considered to be outside of the collision avoidance zone.

Flip-flop 94, controlling the energization of channel 52, in reset similarly to the resetting operation for flip-flop 93. In particular, an output from sync pulse detector 61, pulse stretcher 295 and differentiating detector network 95, all included within channel 52, is coupled to AND gate 97. AND gate 97 is also responsive to the output of AND gate 84, which generates a binary one output only in response to an aircraft leaving the collision avoidance zone. An indication that the aircraft leaving the collision avoidance zone is the aircraft monitored by channel 52 is derived from the output of differentiating and detector network 95, which generates binary one output in response to the trailing edge of the output pulse of pulse stretcher 295.

To provide a more complete understanding of the present invention, let it be initially assumed that the apparatus illustrated by FIG. 2 is included on aircraft 12 and that aircrafts 13 and 14 are outside of the collision avoidance zone. Also, assume that the waveform of the modulation envelope on aircraft 12, at the output of phase shifter 26, and thereby compensated for altitude, is shown by waveform 15, FIG. 3. Under these circumstances, switch 54 is closed for a time interval while no sync UHF pulses are received by antenna 41 from other aircrafts within the collision avoidance zone to preclude coupling of signals from switch 54 to channels 51 and 52, because flip-flops 93 and 94 are both activated to the reset state to open circuit switches 55 included within both channels.

Now assume that aircraft 14 moves within the collision avoidance zone, whereby UHF modulation passing through switch 54 on aircraft 12 is amplitude modulated in accordance with waveform 31, FIG. 3. Waveform 31, as illustrated, includes two complete amplitude modulation parts 101, separated by a zero level base amplitude 102. Amplitude 102 is derived during the time intervals while switch 54 is opened, commensurate with ranges outside of the aircraft collision avoidance zone. Within each of modulation sections 101 is a sync pulse 103, delayed with respect to sync pulse 18, as derived from the output of sync detector 28 on aircraft 12, by an amount commensurate with the range between aircrafts 12 and 14. Modulation section 101 also includes a plurality of pulses 104, having an amplitude less than sync pulses 103, and durations and positions determined by code generator 29 included on aircraft 14.

All of the finite amplitude pulses 103 and 104 included within modulation sections 101 ride on a UHF carrier determined by the common local oscillator frequency of aircrafts 12–14, as well as the relative velocity between aircrafts 12 and 14. As indicated supra, it is the function of phase locked loop 56 to extract the Doppler shift frequency of the UHF carrier due to the relative velocity between aircrafts 12 and 14 and to indicate a forthcoming collision between the aircrafts if the satellite signal on the carrier wave indicates that the rate of change of the Doppler frequency shift is zero or nearly zero.

Consideration will now be given to the manner by which detector 22 responds to range sync pulses 103 of wavetrain 31 to enable channel 51 to monitor the Doppler frequency shift of aircraft 14. In response to the received sync pulses 103 passing through switch 54, sync detector 81 generates a pulse having an occurrence time coincident with each of sync pulses 103. At all intervals other than while sync pulse 103 is being derived, the output of sync detector 81 is a zero level. The output of sync detector 81 is fed to AND gate 82 which remains closed while the first sync pulse 103 is being regenerated by sync pulse detector 81. In response to the second sync pulse 103 being regenerated by sync pulse detector 81, the first regenerated sync pulse 103 is being derived from the output of delay network 83, whereby AND gate 82 is enabled in response to the regenerated sync pulses derived by detector 81 and delay 83. AND gate 82 thereby generates a short duration pulse having a length equal to the overlap period between adjacent regenerated sync pulses to enable AND gates 91 and 92.

AND gate 91 is now enabled, to the exclusion of AND gate 92 because of the connection between the zero output of flip-flop 93 to the AND gates. Thereby, the regenerated binary one pulse derived by AND gate 82 is fed through AND gate 91 to activate the set input of flip-flop 93, triggering the flip-flop so that a binary one signal is derived from its one output. In response to the binary one output of flip-flop 93, switch 55 is closed enabling tracker channel 51 to be responsive to modulation passing through switches 54 and 55. Switch 54 is closed by the output of stretcher 255 only for a short duration, commensurate with the remainder of the distance in the collision avoidance zone, after the initial closure of the switch 55 so that only a very small portion of the UHF modulation from aircraft 14 is fed into phase locked loop 56. Generally, this small portion of the UHF modulation from aircraft 14 is generally insufficient to enable the phase locked loop to initiate a frequency tracking operation.

When the third VHF sync pulse 18 from satellite 11 is detected by sync pulse detector 28, switch 54 is again closed; this time simultaneously with switch 55 of channel 51 so that a complete modulation section 101 of the received UHF carrier from aircraft 14 is gated into phase locked loop 56. In response to a complete modulation section 101, generally having a duration on the order of 100 microseconds, being gated into phase locked loop 56 of channel 51, the phase locked loop initiates frequency tracking. After a number of sections 101 have been gated to phase locked loop 56 of channel 51, voltage controlled oscillator 257 thereof is set so that the phase locked loop serves as a filter for the Doppler frequency transmitted by aircraft 14. As the relative velocities between aircrafts 12 and 14 vary, the frequency of voltage controlled oscillator 257 changes in a corresponding manner. Oscillator 257 tracks changes in the carrier frequency received by antenna 41 from aircraft 14 because the relative velocities between the aircraft 12 and 14 cannot change in a sudden, step function manner. In contrast, the rate of change of velocity between aircrafts 12 and 14 is low enough to enable voltage controlled oscillator 256 to follow it faithfully. The rate of change between the aircraft velocities is not so low, however, as to preclude detection with FM detector 71 and differentiator 72.

Next assume that aircraft 14 has moved closer to aircraft 12 than it was previously so that the modulation envelope of the carrier thereof fed through switch 54 is indicated by waveform 32. Waveform 32 includes a plurality of modulation segments 105 between which is a base, zero amplitude segment 106, corresponding with the time switch 54 is open. Each of modulation sections 105 includes a sync pulse 107, having a separation relative to sync pulse 18 less than the separation between sync pulses 18 and 103 because of the now assumed closer proximity between aircrafts 12 and 14. Also included within each of modulation sections 105 is a plurality of constant amplitude sections 108, having differing durations and occurrence times. The occurrence and position of pulses 108 are determined by the characteristics of code generator 29 included on aircraft 14 but differ from those in modulation section 101 because of the changing positions of the sync pulses 103 and 107 for the two ranges being considered.

Next assume that with aircraft 14 located whereby the modulation envelope of the output of switch 55 of channel 51 is illustrated by waveform 32, aircraft 13 comes within the collision avoidance zone. The modulation envelopes at the output of switch 54 in response to the UHF signal, received by antenna 41 from aircrafts 12 and 13 are respectively shown by waveform 32 and 33. Waveform 33 includes a plurality of modulation sections 109, each including a sync pulse 111, displaced from sync pulse 18 by a greater separation than the separation between sync pulses 18 and 107 because of the relative ranges between aircrafts 12–14. Each of modulation sections 109 also includes a plurality of UHF modulated pulses 112, having occurrence times and widths determined by code generator 29 included within aircraft 13. It is noted that there is a nonoverlapping relationship between an appreciable portion of the pulses 107, 108, 111 and 112 of modulation sections 105 and 109. By providing an appreciable nonoverlap between the UHF carriers received by antenna 41 from aircrafts 13 and 14, the phase locked loops 56 included within channels 51 and 52 become phase locked only to the carriers recieved from aircrafts 13 and 14, without being responsive to intermodulation between the carriers from a pair of aircraft, to provide effective frequency filtering.

Channel 51 responds to modulation section 105 and tracks the UHF carrier thereof because the sync pulses received from aircraft 14 slowly translate from the positions shown by pulses 103 in waveform 31 to the position shown by pulses 107 in waveform 32. Hence, switch 55 remains closed and the frequency of oscillator 257 changes with the relative velocity between aircrafts 12 and 14.

In response to the first UHF sync pulse 111 received on aircrart 12 from aircraft 13, sync detector 81 derives a short duration pulse that is not coupled through AND gate 82. In response to the second modulation section 109 of wavetrain 33 being received by antenna 41 from aircraft 13, a pulse is derived from detector 81 simultaneously with the derivation of a regenerated pulse from delay network 83 to enable AND gate 82. AND gate 82 thereby generates a short duration pulse which is fed to the inputs of AND gates 91 and 92. AND gate 91, however, cannot respond to the output of AND gate 82 at the present time becaue flip-flop 93 is activated to a set state, whereby a zero level is derived from the zero output of the flip-flop. AND gate 92 is, however, enabled by the output of AND gate 82 because of the connection thereof to the zero outputs of flip-flops 93 and 94. In response to the resulting output of AND gate 92, flip-flop 94 is activated to the set state to close switch 55 included within channel 52. In response to closure of switch 55 in channel 52, the phase locked loop 56 of that channel is rendered responsive to the UHF modulation received by antenna 41 from aircraft 13 during the third modulation section 109.

To preclude tracking of channel 52 on the carrier received by antenna 41 from aircraft 13, rather than aircraft 14, the outputs of sync pulse detectors 61 of channels 51 and 52 are combined in AND gate 121. In response to the simultaneous occurrence of pulses from detectors 61 of channels 51 and 52, indicative of the channels tracking targets at identical range and thereby the same target, AND gate 121 derives a binary one output to activate inhibit gate 122 connected between the output of low pass filter 265 and voltage controlled oscillator 257 of the phase locked loop included within monitoring channel 52. In response to gate 122 being inhibited, oscillator 257 is activates so that the frequency derived thereby is its preselected frequency and channel 52 has an opportunity to frequency track on the UHF carrier received by aircraft 12 from aircraft 13. Because frequency tracking of oscillator 257 included within channel 52 is precluded each time the oscillator attempts to lock on to the received carrier from aircraft 14, the oscillator eventually will track on the received frequency from aircraft 13. Generally, the time required for oscillator 257 of channel 52 to lock on to the carrier received from aircraft 13 is considerably less than 1 second.

Channel 52, once it has tracked on to the carrier received from aircraft 13, functions in exactly the same manner as channel 51 to derive indications of the range between aircrafts 12 and 13 and a collision course between the aircraft, in response to changes in the relative velocities of the aircrafts, as reflected in the change in the Doppler frequency of the UHF carrier received by aircraft 12 from aircraft 13. Channels 51 and 52 continue to track the range and possibility of collision between aircrafts 12–14 in the manner stated until one of the aircrafts moves out of the collision warning zone.

Assume now that aircraft 13 moves out of the collision warning zone. In response to such an occurrence, delay network 83 derives a short duration pulse, while no pusle is being generated by sync pulse detector 81. The presence and absence of pulses respectively derived by delay network 83 and sync pulse detector 81 is sensed by AND gate 84 deriving a short duration pulse. While AND gate 84 is deriving a pulse, the state of pulse stretcher 295 of channel 52 changes from a relatively large amplitude to a zero level because there is no pulse derived from sync detector 61 of channel 52 to activate the pulse stretcher. The trailing edge of the output of pulse stretcher 293 is sensed by the channel 52 differentiating and detecting network 95 which derives a short duration pulse in time coincidence with the output of AND gate 84. The simultaneous occurrence of short duration output pulses generated by AND gate 84 and differentiating and detecting network 95 of channel 52 is sensed by AND gate 97 generating a further pulse that activates flip-flop 94 to the reset state. In response to flip-flop 94 being reset, the one output thereof is driven to the binary zero state to open switch 55 included within channel 52. Thereby, channel 52 no longer tracks aircraft 13 and the voltage controlled oscillator 257 thereof is returned to its center frequency. In response to another air craft coming within the collision avoidance zone, channel 52 is again activated, presuming channel 51 still to be tracking aircraft 14.

For certain applications, the complexity of a system for deriving indicating signals in the form of activation of lamps 75 and 79, as well as buzzer 76, is not needed. In many instances, the warning of an impending collision can be provided with an aural tone responsive means, such as a set of head phones. In particular, in a situation wherein it is contemplated that not more than two aircrafts will be in the collison warning zone, a set of head phones may be utilized. An operator listening to the head phones is able to discern the variations in the rate of change of the tones without excessive difficulty.

Figure 4:
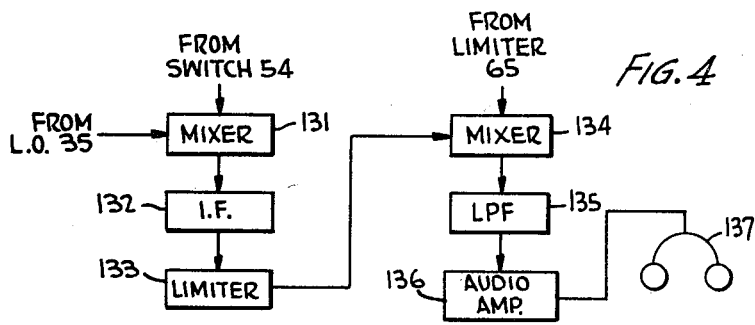
FIG. 4 is a block diagram of a detector in accordance with a second embodiment of the invention.

A relatively simple and inexpensive system for supplying, to a set of head phones, tones indicative of the Doppler frequency shift between the aircraft carrying the detector and other aircraft within the collision avoidance zone is illustrated by the block diagram of FIG. 4. In the system illustrated by FIG. 4, the spectrum derived from switch 54 is heterodyned with the output of local oscillator 35 in mixer 131. The output of mixer 131 includes a difference. IF frequency having amplitude and frequency variations which are a replica of the amplitude and carrier frequency variations of the signals received by antenna 41. The difference frequency output of mixer 131 is passed through IF network 132 to the exclusion of the remaining frequencies derived by the mixer. The amplitude of the output IF network 132 is stabilized by limiter 133 which drives mixer 134, also responsive to the stable, reference frequency derived by limiter 65.

Mixer 134, in effect, compares the stable, VHF reference frequency, received on the aircraft from satellite 11, with the frequency of the UHF carrier received by antenna 41. While the output of mixer 134 is also responsive to drift in the frequencies of local oscillator 35 contained on the aircraft carrying detector 22 and the aircraft transmitting a signal gated to mixer 131, these variations have a negligible rate of change compared to the Doppler frequencies of the two aircrafts for which collision avoidance is desired.

The beat frequency output of mixer 134 is passed through low pass filter 135 to the exclusion of other frequencies derived by the mixer. The output of low pass filter 135 is thereby a replica of the Doppler frequency shift in the carrier frequency received by antenna 41 and indicative of the relative velocity between the two aircraft. In response to antenna 41 receiving signals from more than one aircraft within the collision avoidance zone, low pass filter 135 derives a pair of tones, each indicative of the Doppler frequency shift on the UHF carrier received from the different aircraft.

The Droppler frequency shift, velocity indicating output signal of low pass filter 135 is applied to auido amplifier 136 which feeds head phones 137. If an operator listening to head phones 137 perceives a changing pitch in the tones he hears, he is apprised of the fact that he is not on a collision path with an aircraft in the collision warning zone. If, however, a constant pitch is heard by the operator, he must be prepared to take evasive action to avoid a mid-air collision.

While there have been described and illustrated several specific embodiments of the invention, it will be clear that variations in the details of the embodiments specifically illustrated and described may be made without departing from the true spirit and scope of the invention as defined in the appended claims. For example, the apparatus and techniques described in conjunction with the present invention are applicable to other types of vehicles than aircrafts, such as ships. If the range finding function is not needed, the satellite signal can be a pure, unmodulated sinusoid. To appraise others of the altitude of aircrafts carrying a transceiver of the present invention, the output of altimeter 227 can modulate the signal transmitted from antenna 41. A further aspect of the invention involves controlling an autopilot on large aircraft and helicopters in response to the range indicating signal derived by circuit 62.

I claim:
1. A method of preventing effective communication between stations otherwise capable of communicating with each other and located more than a selected distance from each other, at least one of said stations including receiver means responsive to energy transmitted from the other station, comprising the steps of transmitting a first pulse to said stations from a position remote from said stations so that the first pulse arrives at said stations at substantially the same time, transmitting a second pulse from the other station upon receipt of said first pulse, receiving the first pulse at said one station, enabling the receiver means in response to receipt of said first pulse at said one station, and decoupling a portion of the receiver means after receipt of the first pulse at the one station, the time of decoupling being determined by the selected distance and the propagation time of the energy between the stations.

2. The method of claim 1 wherein the pulse is transmitted on an r.f. carrier from a synchronous satellite.

3. The method of claim 1 wherein the pulses are repetitively transmitted, and again coupling the receiver means portion in response to receipt of the pulse.

4. The method of claim 1 wherein the pulse is transmitted on an r.f. carrier from a satellite in synchronous orbit above a region wherein the vehicles are located.

5. A method of warning the operator of a vehicle of intruding vehicles comprising the steps of:
transmitting synchronizing signals from a satellite to said vehicles;
receiving said synchronizing signals by each of said vehicles;
transmitting response signals by each of said vehicles in response to said synchronizing signals;
opening a receiving gate in each of said vehicles for said response signal, in response to said synchronizing signals; and, closing said receiving gate after a predetermined period of time to prevent the passage through said gate of any response signals that are received after said predetermined period of time has passed.

6. A method of warning the operator of a vehicle of intruding vehicles as claimed in claim 5 including the additional step of displaying information derived from response signals passing through said gate prior to closing said gate.

7. A method of warning the operator of a vehicle of intruding vehicles as claimed in claim 6 including the additional step of coding information onto said response signals.

8. The method of claim 5 wherein the satellite is in synchronous orbit above a region wherein the vehicles are located.

9. Apparatus for warning the operator of a vehicle of intruding vehicles comprising:
a satellite, said satellite transmitting synchronizing signals to said vehiclle;
receiving means located onboard each of said vehicles for receiving said synchronizing signals;
transmitting means located onboard each of said vehicles for transmitting a response signal in response to said synchronizing signal; and
receiving gate means located onboard each of said vehicles for receiving response signals from other vehicles, said receiving gate means including a gate for passing said response signals, said gate being open for a predetermined period of time in response to received synchronizing signals to allow the passage of response signals and closed after said predetermined period of time has elapsed to prevent the passage of any response signals received after said predetermined period of time has elapsed.

10. Apparatus for warning the operator of a vehicle of intruding vehicles as claimed in claim 9 including display means for displaying information derived from response signals passing through said receiving gate means prior to the closing of said receiving gate means, said display means being connected to said receiving gate means.

11. Apparatus for warning the operator of a vehicle of intruding vehicles as claimed in claim 10 including coding means connected to said transmitting means for coding information onto said response signals.

12. The apparatus of claim 9 wherein the satellite is in synchronous orbit above a region wherein the vehicles are located.

13. Apparatus mountable onboard a vehicle for warning the operator of the vehicle of intruding vehicles comprising:
receiving means receiving synchronizing signals from a satellite;
transmitting means for transmitting a response signal in response to said synchronizing signal; and,
receiving gate means for receiving response signals from other vehicles, said receiving gate means including a gate for passing said response signals, said gate being open for a predetermined period of time in response to received synchronizing signals to allow the passage of response signals and closed after said predetermined period of time has elapsed to prevent the passage of any response signals received after said predetermined period of time has elapsed.

14. Apparatus mountable onboard a vehicle for warning the operator of the vehicle of intruding vehicles as claimed in claim 13 including display means for displaying information derived from response signals passing through said receiving gate means prior to the closing of said receiving gate means, said display means being connected to said receiving gate means.

15. Apparatus mountable onboard a vehicle for warning the operator of the vehicle of intruding vehicles as claimed in claim 14 including coding means connected to said transmitting means for coding information onto said response signals.

16. The apparatus of claim 13 wherein the satellite is in synchronous orbit above a region wherein the vehicles are located.

17. A method of warning the operator of a first vehicle of an intruding vehicle comprising the steps of:
transmitting synchronizing signals from a satellite to said vehicles;
receiving said synchronizing signals by each of said vehicles;
transmitting response signals by each of said vehicles in response to said synchronizing signals;
opening a receiving gate in said first vehicle for said response signal, in response to said synchronizing signals; and,
closing said receiving gate after a predetermined period of time to prevent the passage through said gate of any response signals that are received after said predetermined period of time has passed.

18. The method of claim 17 wherein the satellite is in synchronous orbit above a region wherein the vehicles are located.

19. Apparatus for warning the operator of a first vehicle of an intruding vehicle comprising:
a satellite , said satellite transmitting synchronizing signals to said vehicles;
receiving means located onboard each of said vehicles for receiving said synchronizing signals;
transmitting means located onboard each of said vehicles for transmitting a response signal in response to said synchronizing signal; and
receiving gate means located onboard said first vehicle for receiving response signals from an intruding vehicle, said receiving gate means including a gate for passing said response signals, said gate being open for a predetermined period of time in response to received synchronizing signals to allow the passage of response signals and closed after said predetermined period of time has elapsed to prevent the passage of any response signals received after said predetermined period of time has elapsed.

20. The apparatus of claim 19 wherein the satellite is in synchronous orbit above a region wherein the vehicles are located.

21. Apparatus mountable onboard a first vehicle for warning the operator of the vehicle of an intruding vehicle comprising:
receiving means receiving synchronizing signals from a satellite;
transmitting means for transmitting a response signal in response to said synchronizing signal; and,
receiving gate means for receiving response signals from an intruding vehicle, said receiving gate means including a gate for passing said response signals, said gate being open for a predetermined period of time in response to received synchronizing signals to allow the passage of response signals and closed after said predetermined period of time has elapsed to prevent the passage of any response signals received after said predetermined period of time has elapsed.

22. The apparatus of claim 21 wherein the satellite is in synchronous orbit above a region wherein the vehicles are located.

23. A method of signalling only between stations within a predetermined distance of each other comprising the steps of transmitting a radio wave having a synchronizing signal modulated thereon from a point via line-of-sight communication links to each of the stations, said point and stations being positioned so that the synchronizing signal is effectively received at each station at substantially the same time, in response to receipt of the synchronizing signal at each station initiating line-of-sight transmission of second radio waves between the stations, and responding at one of said stations to said second waves only for a predetermined time interval after receipt of the signal at said one station, said interval being initiated by receipt at said one station of the synchronizing signal, said time interval being determined by the propagation velocity of said waves between the stations and the predetermined distance.

24. The method of claim 23 wherein the point is located on an artificial earth satellite.

25. The method of claim 24 wherein the satellite is in synchronous orbit above a region wherein the stations are located.

26. A method of signalling only between stations within a predetermined distance of each other comprising the steps of transmitting a wave having a synchronizing signal modulated thereon from a point to each of the stations in such a manner that the synchronizing signal is effectively received at each station at substantially the same time, in response to receipt of the synchronizing signal at each station initiating line-of-sight transmission of second waves between the stations, and responding at one of said stations to said second waves only for a predetermined time interval after receipt of the signal at said one station, said interal being initiated by receipt at said one station of the synchronizing signal, said time interval being determined by the propagation velocity of said waves between the stations and the predetermined distance.

27. In a cooperative vehicle warning method for enabling vehicles only within a predetermined distance of each other to communicate with each other, the steps of transmitting a radio wave having a synchronizing signal modulated thereon from a point via line-of-sight communication links to each of the vehicles, said point and vehicles being positioned so that the synchronizing signal is effectively received at each station at substantially the same time, in response to receipt of the synchronizing signal at each vehicle initiating line-of-sight transmission of second radio waves between the vehicles, in response to receipt of the synchronizing signal at one vehicle enabling a receiver at the one vehicle to become responsive to the second radio waves transmitted from other vehicles, and in response to the passage of a predetermined elapsed time interval after receipt of the synchronizing signal at said one vehicle preventing the receiver at said one vehicle from being responsive to the second radio waves transmitted from other vehicles, said time interval being determined by the propagation velocity of radio waves between the vehicles and the predetermined distance.

28. The method of claim 27 wherein the point is located on an artificial earth satellite.

29. The method of claim 28 wherein the satellite is in synchronous orbit above a region wherein the vehicles are located.

30. In a cooperative vehicle warning method for enabling vehicles only within a predetermined distance of each other to communicate with each other, the steps of transmitting a radio wave having a synchronizing signal modulated thereon from a point to each of the vehicles in such a manner that the synchronizing signal is effectively received at each station at substantially the same time, in response to receipt of the synchronizing signal at each vehicle initiating line-of-sight transmission of second radio waves between the vehicles, in response to receipt of the synchronizing signal at one vehicle enabling a receiver at the one vehicle to become responsive to the second radio waves transmitted from other vehicles, and in response to the passage of a predetermined elapsed time interval after receipt of the synchronizing signal at said one vehicle preventing the receiver at said one vehicle from being responsive to the second radio waves transmitted from other vehicles, said time interval being determined by the propagation velocity of radio waves between the vehicles and the predetermined distance.

31. Apparatus adapted to be mounted on a vehicle in a cooperative vehicle warning system for enabling vehicles only within a predetermined distance of each other to communicate with each other, said system including means for transmitting a first radio wave having a synchronizing signal modulated thereon from a point to each of the vehicles in such a manner that the synchronizing signal is received at each of the vehicles at substantially the same time, the apparatus on the vehicle comprising: means for receiving the first radio wave, means for receiving via a line-of-sight communication link a second radio wave transmitted from another vehicle, the second radio wave being transmitted from the another vehicle in response to receipt at the another vehicle of the synchronizing signal, means responsive to receipt of the synchronizing signal for initiating transmission of a radio wave to the another vehicle, and means responsive to receipt of the synchronizing signal for enabling the receiving means for the second radio wave only for a predetermined elapsed time interval after receipt of the synchronizing signal, said time interval being determined by the propagation velocity of radio waves between the vehicles and the predetermined distance.

32. A cooperative vehicle warning system for enabling vehicles only within a predetermined distance of each other to communicate with each other comprising means for transmitting a first radio wave having a synchronizing signal modulated thereon from a point via line-of-sight communication links to each of the vehicles, said point and vehicles being positioned so that the synchronizing signal is received at each of the vehicles at substantially the same time, apparatus on one of the vehicles comprising: means for receiving the first radio wave, means for receiving via a line-of-sight link a second radio wave transmitted from another vehicle; apparatus on the another vehicle including means for transmitting the second radio wave in response to receipt at the another vehicle of the synchronizing signal; the apparatus on the one vehicle further including:

means responsive to receipt of the synchronizing signal for initiating transmission of a radio wave to the another vehicle, and means responsive to receipt of the synchronizing signal for enabling the receiving means for the second radio wave only for a predetermined elapsed time interval after receipt of the synchronizing signal, said time interval being determined by the propagation velocity of said waves between the vehicles and the predetermined distance.

33. The system of claim 32 further including an artificial earth satellite, said point being on said satellite.

34. The apparatus of claim 33 wherein the satellite is in synchronous orbit above a region wherein the vehicles are located.

35. A cooperative vehicle warning system for enabling vehicles only within a predetermined distance of each other to communicate with each other comprising means for transmitting a first wave having a synchronizing signal modulated thereon from a point to each of the vehicles in such a manner that the synchronizing signal is received at each of the vehicles at substantially the same time, apparatus on one of the vehicles comprising: means for receiving the first wave, means for receiving via a line-of-sight link a second wave transmitted from another vehicle; apparatus on the another vehicle including means for transmitting the second wave in response to receipt at the another vehicle of the synchronizing signal; the apparatus on the one vehicle further including: means responsive to receipt of the synchronizing signal for initiating transmission of a wave to the another vehicle, and means responsive to receipt of the synchronizing signal for enabling the receiving means for the second wave only for a predetermined elapsed time interval after receipt of the synchronizing signal, said time interval being determined by the propagation velocity of said waves between the vehicles and the predetermined distance.

36. Apparatus at a station in a communication system with a vehicle within only a predetermined distance of the station, said system including means for transmitting a first radio wave having a synchronizing signal modulated thereon from a point to the station and vehicles in such a manner that the synchronizing signal is received at the station and vehicle at substantially the same time, the apparatus at the station comprising: means for receiving the first radio wave, means for receiving via a line-of-sight communication link a second radio wave transmitted from the vehicle, the second radio wave transmitted from the vehicle being initiated on the vehicle in response to receipt at the vehicle of the synchronizing signal, means responsive to receipt of the synchronizing signal for initiating transmission of a radio wave to the vehicle, and means responsive to receipt of the synchronizing signal for enabling the receiving means for the second radio wave only for a predetermined elapsed time interval after receipt of the synchronizing signal, said time interval being determined by the propagation velocity of said waves between the station and vehicle and the predetermined distance.

37. A communication system between a station and a vehicle within only a predetermined distance of the station comprising means for transmitting a first radio wave having a synchronizing signal modulated thereon from a point via line-of-sight communication links to the station and vehicles, said point, station and vehicles being positioned so that the synchronizing signal is received at the station and vehicles at substantially the same time; apparatus at the station comprising: means for receiving the first radio wave, means for receiving via line-of-sight link a second radio wave transmitted from a vehicle; apparatus on the vehicle including means for initiating transmission of the second radio wave in response to receipt at the vehicle of the synchronizing signal; said station further including: means responsive to receipt of the synchronizing signal for initiating transmission of a radio wave to the vehicle, and means responsive to receipt of the synchronizing signal for enabling the receiving means for the second radio wave only for a predetermined elapsed time interval after receipt of the synchronizing signal, said time interval being determined by the propagation velocity of said waves between the station, vehicle and the predetermined distance.

* * * * *